July 28, 1925.
J. R. BAKER
1,547,715
CASED GLASS AND ARTICLES MADE THEREFROM
Filed Oct. 14, 1922
FIG. 1.
FIG. 2.
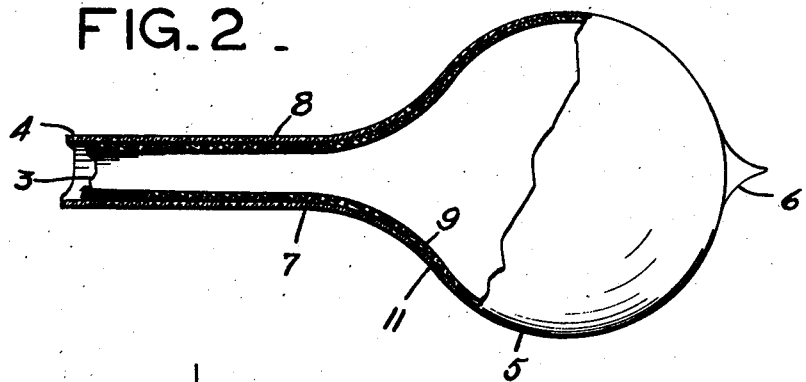
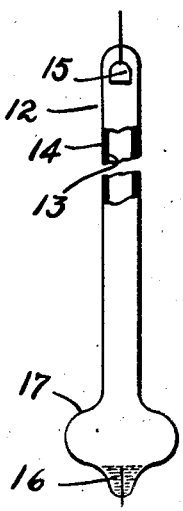
FIG. 3.
INVENTOR
JAMES R. BAKER
BY
ATTORNEY Patented July 28, 1925.

1,547,715

UNITED STATES PATENT OFFICE.

JAMES REID BAKER, OF ARLINGTON, NEW JERSEY, ASSIGNOR TO WESTINGHOUSE LAMP COMPANY, A CORPORATION OF PENNSYLVANIA.

CASED GLASS AND ARTICLES MADE THEREFROM.

Application filed October 14, 1922. Serial No. 594,494.

*To all whom it may concern:*

Be it known that I, JAMES REID BAKER, a citizen of the United States, and a resident of Arlington, in the county of Essex and State of New Jersey, have invented a new and useful Improvement in Cased Glass and Articles Made Therefrom, of which the following is a specification.

This invention relates to cased or composite glass and articles made therefrom and more particularly to a glass the inner surface of which is resistant to the action of alkali metals or the vapors thereof and the outer surface of which comprises glass of a usual composition.

An object of my invention is the formation of articles of glass provided with linings chemically resistant to the action of alkali metals or their vapors.

Another object of my invention is the manufacture of evacuated vessels containing alkali-metal vapor, for example, sodium-vapor lamps, and comprising an inner coating of glass, resistant to the action of such vapor and an outer coating or base of a glass, more readily worked and sealed than glass resistant to such action.

A further object of my invention is to facilitate the working of glass, resistant to the action of alkali-metal vapor, by forming the same with a backing or base of ordinary silica glass having approximately the same coefficient of expansion as that of the alkali-metal-resistant glass.

A still further object of my invention is the production of composite articles of glass comprising an inner coating of borate glass or glass free from silica backed with or applied on silica glass to facilitate the working of such borax glass.

Other objects and advantages of my invention will be apparent upon reading the following description.

Ordinary glass, that is, glass containing silica, as is well known, is readily attacked by sodium and other alkali metals when such are heated in contact therewith. For use as containers or envelopes for devices employing alkali-metal vapor, in whole or in part, for lighting or other purposes, it is desirable to make use of glass free from silica or other compounds that become decomposed by the action of alkali-metals.

Such glass has been developed and is the subject matter of the application of A. H. Compton, Serial No. 417,378, filed October 16, 1920, glass and articles made therefrom and assigned to the Westinghouse Lamp Company. The glass described in said application makes use of boric oxide instead of silica and is, therefore, called borate glass. Such glass, which ordinarily comprises a mixture of boric oxide, 50 to 75%, with the oxides of sodium, aluminum and calcium, is a true glass, although one of unusual composition, and is suitable for resisting the action of sodium and the other alkali metals or their vapors but is not very easily worked and is, therefore, more or less difficult to manufacture into sealed-in vessels or the like, for such devices as may use sodium or other alkali metals as their source of light or for other purposes, involving the heating of such metals in contact with the glass.

According to my invention, I obviate the difficulties incident to working and sealing-in alkali-metal-resistant glass by the production of what may be termed a composite glass. Such glass may be prepared by consolidating together two or more layers, laminations, sheets, tubes or other portions of glass of a desired shape, at least one of which is a glass, such as borate glass, which is resistant to the action of the alkali metals and the other or others of which may be ordinary glass, that is, glass having a substantial proportion of silica therein. If more than two layers are used, a layer of glass of one kind, preferably alternates with that of another, for example, a plate of ordinary silica glass may be coated on both sides with alkali-metal-resistant glass. In making such composite glass, it is preferable that the different kinds of glass consolidated together have substantially the same coefficient of expansion to avoid strains due to changes in the temperature of such glass, but the melting and softening points of the silica glass may be, and preferably are, higher than that of the borate glass.

Any suitable method may be used for producing my composite glass, for example, a small ball of sodium-resistant glass may be gathered on the end of a glass-blower's blowpipe and this ball then covered with another glass, for example, a lead or lime glass of approximately the same coefficient of expansion as that of the sodium-resistant glass. Such a coated ball of sodium-resistant glass, may then be drawn or blown into any desired form. If prepared in tubular or bulbous forms, the inner surface will naturally be composed of such sodium-resistant glass and the outer surface will comprise the glass applied thereto, for example, the lime or lead glass used.

If the alkali-metal-resistant glass, as well as the other glass with which the resistant glass is to be incorporated, are available in tubular form, the same may be consolidated by enclosing a tube of resistant glass in a tube of the other glass, applying heat thereto and blowing the inner tube until the two are consolidated. Instead of merely consolidating the tubes, the same may be blown into bulbular form of any desired size and shape.

My invention will better be understood by referring to the accompanying drawing, illustrating one embodiment thereof and in which, Fig. 1 is a side elevation, partly in section, of a tube of alkali-metal-resistant glass surrounded by a tube of silica glass;

Fig. 2 is a side elevation, partly in section, of said glass tubes after the same have been heated, consolidated and blown into bulbular form; and, Fig. 3 is a side elevation, partly broken away and partly in section, of a metallic vapor lamp, which may contain alkali-metal vapor during the operation thereof.

The tube 3 (Fig. 1) may be composed of borate glass, or glass resistant to the action of the alkali metals, of any desired composition, for example, comprising the following materials in the indicated proportions by weight.

| | Per cent. |
|---|---|
| Sodium oxide | about 13 |
| Aluminum oxide | about 15 |
| Calcium oxide | about 12 |
| Boron oxide | about 60 |

Although the above proportions are stated as an example, it is obvious that the exact proportions are not essential, as the main idea is that the glass will be free from silica or other oxide reducible by the alkali metals and the usual silica content in glass is therefore replaced by an oxide, such as that of boron. It is obvious that substitutions may be made in the above formula, as well as changes in the proportions of the constituents. For example, sodium oxide may be replaced by, or have in addition thereto, an oxide or oxides of other alkali metals. Likewise, calcium oxide may be replaced by or have added thereto, an oxide or oxides of other alkaline-earth metals. The oxides of magnesium, thorium, zirconium and the like, may also be employed as constituents of the borate glass.

Tube 3 may be surrounded by tube 4, which is preferably only slightly larger than tube 3, and may be composed of any ordinary glass having approximately the same coefficient of expansion as that of the borate glass used for tube 3. Glasses which have been successfully used with borate glass of the above noted composition are Corning lead glass, composition G-1, and Corning lime glass, although it is obvious that any glass may be used having approximately the same coefficient of expansion as the glass of tube 3.

These tubes, in the position shown in Fig. 1, may then be heated, as by the action of glass-blowers' bench fires thereon, and blown or drawn to the desired form. The tubes are first heated to cause them to soften sufficiently, so that tube 3 may be blown out against tube 4, to be consolidated therewith and both may then be blown to any desired shape such, for example, as the bulbous shape 5, shown in Fig. 2. The tube adjacent to one end of the bulb may then be drawn out and tipped off at 6, leaving the bulb 5 with its neck 7 and, extending therefrom, the separate tubes 3 and 4.

The tubes 3 and 4 may be broken off beyond the point 8 where such tubes become consolidated or welded together. The bulb 5, with its neck 7, will comprise an inner wall 9 of borate glass and an outer wall 11 of lead, lime or other desired glass, which preferably contains silica. Such bulb may be used for sodium-vapor devices or any devices containing an alkali metal. Although only a simple form is shown in the drawing, it is obvious that composite glass, according to my invention, may be prepared in various forms of any desired size.

A lamp may be constructed with an envelope, such as shown in Fig. 2, with the inner wall of borate glass. Such lamp is illustrated complete, as to essentials, in Fig. 3. When the lamp is evacuated and sealed in, which latter operation is rendered easier because of the outer wall of glass containing silica, the inner portion or wall of such bulb is protected from the action of moisture and thereby prevented from possible deterioration.

In greater detail, the lamp illustrated in Fig. 3, may comprise a tubular glass container 12 consisting of an inner wall 13 of glass resistant to the action of alkali metals and an outer wall 14 of any desired kind of silica glass having a coefficient of expansion practically the same as that of the glass composing the wall 13, consolidated therewith according to my invention. A positive electrode for the lamp is shown at 15 and may consist of iron, tungsten or any refractory conducting material not affected by alkali metals. The negative electrode 16, in this instance, may consist of sodium or an alloy or mixture of sodium with another or other alkali metals or an alkali-metal amalgam. Such negative electrode 16 is shown contained in the enlargement 17 of the glass container 12. The container 12 may also enclose an inert gas, such as argon, neon or the like.

When a suitable potential is impressed between the electrodes 15 and 16, an arc or discharge occurs in the tube 12, and the sodium, if such is used, is vaporized to emit light. Because of the construction of the tube 12, with an inner coating of sodium resistant glass, the same will operate for a much longer time without deterioration than if the same were constructed of an ordinary glass.

Although I have shown a conventional form of tube, it is obvious that any desired form may be employed for my alkali-metal vapor-lamp; for example, one of the forms disclosed in Patent No. 1,076,058 to Podszus, October 21, 1913 or that form disclosed in Patent No. 1,200,770 to Skaupy, October 10, 1916.

Instead of forming composite glass articles as heretofore described, the same may be made by the usual process which is used in making articles of cased glass, such as by blowing a ball of alkali-metal-resistant glass covered with another glass of the same coefficient of expansion and having a higher melting point, into the desired form. More in detail, such method may comprise gathering a small ball of borate glass on the end of a glass-blower's blow-pipe, allowing this ball to harden slightly, dipping the same into a pot of melted glass of the desired composition and blowing the coated ball to the desired size and shape.

It should be understood that, wherever the term "sodium" or "alkali-metal" is employed, the vapors thereof are also included, as well as the same in a heated or melted condition.

Although I have described what I now consider the preferred embodiment of my invention, it is to be understood that modifications may suggest themselves to those skilled in the art within the spirit and scope of the appended claims.

What is claimed is:

1. Composite glass comprising a coating of a material resistant to the chemical action of alkali metals and vapors thereof.

2. Composite glass comprising two laminations of different kinds of glass consolidated together, one of said laminations being resistant to the chemical action of alkali metals.

3. Composite glass comprising silica glass on one side and borate glass on the other side.

4. Composite glass comprising a consolidation of walls or layers of a plurality of glasses, one of which is a borate glass, free from silica.

5. A vessel or the like comprising an inner coating of a glass resistant to the action of alkali metals.

6. A vessel or the like adapted to be evacuated for use as an enclosure for an alkali-metal vapor-device and comprising an outer portion of silica glass and an inner coating of borate glass.

7. A vessel or the like the walls of which comprise a consolidation of a layer of glass resistant to the action of the alkali metals and a layer of glass of a higher melting point.

8. A vessel or the like comprising silica glass coated on the interior thereof with borate glass.

9. A vessel or the like comprising a consolidation of alternate layers of alkali-metal-resistant glass and silica glass.

In testimony whereof, I have hereunto subscribed my name this thirteenth day of October 1922.

JAMES REID BAKER.